United States Patent

Sheldon et al.

[11] Patent Number: 5,931,600
[45] Date of Patent: Aug. 3, 1999

[54] THERMAL DESORPTION AND DESTRUCTION OF DENSE NON-AQUEOUS PHASE LIQUID IN FRACTURED BEDROCK

[75] Inventors: Richard Blair Sheldon, Scotia; Icko Eric Timothy Iben, Glenville; William Alan Edelstein, Schenectady, all of N.Y.

[73] Assignee: General Electric Company, Schenectady, N.Y.

[21] Appl. No.: 08/908,273

[22] Filed: Aug. 7, 1997

Related U.S. Application Data

[62] Division of application No. 08/674,056, Jul. 1, 1996.

[51] Int. Cl.$^6$ ........................................................ B09B 1/00
[52] U.S. Cl. .......................... 405/128; 405/131; 588/252
[58] Field of Search ................................... 405/128, 131; 588/252; 431/5, 7; 110/236, 346

[56] References Cited

U.S. PATENT DOCUMENTS

| | | | |
|---|---|---|---|
| 4,670,634 | 6/1987 | Bridges et al. | 405/131 X |
| 4,688,495 | 8/1987 | Galloway | 110/236 X |
| 4,823,711 | 4/1989 | Kroneberger et al. | 110/236 |
| 4,860,671 | 8/1989 | Glorioso | 110/236 |
| 4,957,393 | 9/1990 | Buelt et al. | 405/128 |
| 5,076,727 | 12/1991 | Johnson et al. | 405/131 X |
| 5,190,405 | 3/1993 | Vinegar et al. | 405/128 |
| 5,360,067 | 11/1994 | Meo | 405/131 X |
| 5,424,045 | 6/1995 | Orman et al. | 431/5 X |
| 5,427,746 | 6/1995 | Pereira et al. | 431/5 X |
| 5,439,594 | 8/1995 | Regan et al. | 166/267 X |
| 5,449,251 | 9/1995 | Daily et al. | 405/128 |
| 5,476,375 | 12/1995 | Khinkis et al. | 431/7 |
| 5,482,402 | 1/1996 | Nelson | 405/128 |
| 5,833,388 | 11/1998 | Edwards et al. | 405/128 X |

Primary Examiner—Dennis L. Taylor
Attorney, Agent, or Firm—Ernest G. Cusick; Noreen C. Johnson

[57] ABSTRACT

An in-situ method for thermal desorption, extraction, and destruction of dense nonaqueous organic contaminants in fractured bedrock is accomplished through the use of thermal wells, a flameless oxidizer, and hot carbon adsorption chambers.

3 Claims, No Drawings

THERMAL DESORPTION AND DESTRUCTION OF DENSE NON-AQUEOUS PHASE LIQUID IN FRACTURED BEDROCK

This application is a division of application Ser. No. 08/674,056, filed Jul. 1, 1996.

This invention is directed to decontamination of subsurface regions consisting of fractured bedrock by thermal desorption and destruction of organic contaminants.

BACKGROUND OF THE INVENTION

Nonaqueous phase liquid is a term generally used to indicate a water-immiscible organic liquid. The term itself or the acronym NAPL specifically refers to the liquid phase which may in fact comprise one or more different chemicals.

Nonaqueous phase liquids have typically been divided into two general categories, dense and light. These terms refer to the specific gravity, or the density of the nonaqueous phase liquid relative to water. Thus, dense nonaqueous phase liquids have a specific gravity greater than water (DNAPL), and the light nonaqueous phase liquids (LNAPL) have a specific gravity less than water. Examples of common LNAPL pollutants are petroleum products, while organic solvents like perchloroethylene (PCE) or mixtures like creosote or coal tar are common DNAPLs. Among dense non-aqueous liquid phase contaminants, the most frequently encountered are chlorinated solvents.

Subsurface DNAPL contamination is important for several reasons. These liquids are commonly found at hazardous waste sites because of their widespread use in industry. Generally, the solubility of components of DNAPL is relatively low, so that the DNAPL forms a long-lived reservoir of subsurface contamination. Most of the mass of the contaminant resides in the DNAPL phase, which may be confined to a relatively small space, because of the physics of immiscible phase flow. Chemical contamination then originates from a small region and has the ability to contaminate large volumes of water through dissolution of chemicals from the DNAPL. Although solubilities may be relatively low, they are usually high enough to be above drinking water standards. A further problem results from the DNAPLs being more dense than water, so they tend to flow to the bottom of aquifers.

The removal of Dense Non-Aqueous Phase Liquids (DNAPL) from fractured bedrock and saturated soils is one of the most challenging problems facing environmental restoration activities worldwide. Since DNAPLs such trichloroethylene, perchloroethylene, polychlorinated biphenyls and the like are more dense than water, free phase contaminants car sink to great depths through ground water until they encounter an impermeable barrier. In certain locations, the impermeable barrier may be a clay lens or bedrock. However, in other sites the bedrock may be fractured, allowing penetration of the DNAPL throughout the fractures. This complicates remedial activities tremendously since the DNAPL serves as a continual source of dissolved contaminants while making remediation extremely complicated. Conventional pump-and-treat technologies can be applied to the impacted areas for centuries without achieving cleanup objectives because of the relatively low solubilities of the contaminants in ground water. In-situ soil flushing, flooding, solvent extraction, biodegradation, or chemical destruction are precluded by the difficulty in treating DNAPL within the bedrock fractures. The existence of DNAPLs, including chlorinated solvents, is one of the most widespread problem at hazardous waste sites throughout the world. DNAPL contamination has impacted drinking water supplies, spread beyond site boundaries, and is the most complex issue facing environmental cleanup efforts. At sites with fractured bedrock, the cleanup is even more difficult.

Contamination of soils and ground water with chlorinated hydrocarbons is a widespread problem caused by early disposal practices, spills, and leaks of chlorinated solvents, PCBs, pesticides, and petroleum products. Examples of DNAPLs include tetrachloroethane, carbon tetrachloride, trichloroethane, chloroform, dichloroethane, vinyl chloride, methylene chloride, and the like.

DESCRIPTION OF THE INVENTION

The principal problem addressed by this in-situ thermal desorption and destruction technology is the remediation of sites with fractured bedrock containing polychlorinated biphenyls (PCB) and chlorinated solvents. Other approaches for remediation of this type of contamination are either environmentally not acceptable to the general public or regulators, not cost-effective, do not result in permanent destruction or removal of the contaminants, or are not technically feasible.

The removal of dense non-aqueous phase liquids (DNAPL) from fractured bedrock can be achieved in-situ by the use of an integrated combination of dewatering, thermal desorption, and destruction or collection technologies. The method is applicable primarily to geologic strata where the fractured bedrock is underlain by a relatively impermeable bedrock layer. The first step is to dewater the affected area using conventional dewatering technologies. However, the entire process is much more cost-effective if the dewatering can be accomplished by intercepting infiltrating ground water upgradient of the contaminated region. This will preclude the need for treatment of contaminated ground water at costs ranging from several hundred thousand to millions of dollars per year. Dewatering should be accomplished by the installation of passive interception trenches or active pumping wells upgradient of the contaminated region. The trench or wells must be installed approximately two feet deeper than the depth of the deepest fractured bedrock to be treated. Depending on the site topography, it may be necessary to surround the treatment area with the interceptor trenches or wells to prevent infiltration of additional ground water. Thermal wells are then installed throughout the area with a nominal distance of six to twelve feet between the wells depending on the contaminant to be treated and the desired heating rate. Electrically-powered resistive heating modules or gas heating units are placed within the wells to thermally desorb and destroy the contaminants. An inert permeable non hygroscope material such as sand or ceramic can be placed in the region surrounding the well to form a hot matrix zone which increases the in-situ destruction of desorbed contaminants as they pass through the hot matrix. The off-gas treatment system can be connected to a flameless thermal oxidizer or other thermal destruction systems to destroy residual contaminants and to convert the hydrocarbons to carbon dioxide and water. This would then be directed through heated carbon beds to collect the residual contaminants. The carbon beds are maintained at a temperature sufficient to avoid condensation of water and to adsorb and hold the organic waste. For chlorinated hydrocarbons, an optional HCl scrubber can be added to the system. The size of the treated volume can be varied by adding or removing thermal wells consistent with power availability and the capacity of the off-gas heating system to maintain negative pressure within the treatment zone and adequately destroy the desorbed contaminants. This integrated system would result in complete on-site removal and destruction of DNAPLs.

The use of heated carbon beds in conjunction with an in-situ destruction of contaminants by oxidation in the hot matrix zone is an important feature of the invention. Heating of the carbon is necessary to prevent condensation of water vapor which reduces efficiency of the carbon. The concept of using heated carbon beds and the ability of these beds to remove chlorinated hydrocarbons has been demonstrated. This will allow the use of a simplified treatment system resulting in less waste and complete treatment on-site.

The dewatering portion of the system can utilize a number of conventional approaches but is most cost-effective if a passive, upgradient interceptor trench is utilized to prevent the infiltration of ground water. By intercepting the ground water before it contacts the contaminants, the ground water can generally be redirected to a surface stream or other downgradient location without the need for extensive treatment to remove contaminants. The trench is similar to a french drain but must be installed to a depth of at least two feet beneath the desired treatment depth. This may entail excavation of soil and fractured bedrock to depths of 75 feet or more. Depending on the site gradient, additional trenches may be required on the other sides of the contaminated region to prevent infiltration from the sides or backflow from the downgradient soils and bedrock. If the trenches cannot be directed to a downgradient location, then a dewatering pump and hose network may be required to pump the ground water out of the affected region. It is not essential to completely dewater the treatment region, but it is desirable to prevent infiltration of additional ground water. Otherwise the thermal wells will not get above the boiling point of water and will not reach the temperatures necessary for desorption and destruction of many contaminants. If interceptor trenches are not feasible, then conventional dewatering systems including the use of sheet piling, grout curtains, or freeze walls coupled to ground water pumping systems may be utilized.

The heat generation portion of the system can consist of electrical resistive heating elements connected in suitable configuration for each group of heaters. An alternative energy source could be propane or gas fueled pipes. Heated gases would pass through a stainless steel pipe. The hot exhaust from the thermal oxidizer could be directed to the thermal wells to heat them or the heated exhaust could be passed through a regenerative heat exchanger to preheat the air being supplied to the thermal wells. This will conserve energy and result in a more cost-effective system. The heaters or gas pipes are operated at a temperature which is sufficient to cause oxidative destruction of contaminants in the well or in the surround soil. Temperatures from 600° to 1000° C. are preferred. The heaters or gas pipes are placed within the wells extending into the fractured bedrock where they are operated for a sufficient period of time to desorb the contaminants being treated. For chlorinated hydrocarbons in fractured bedrock, this time period is on the order of two to four months to desorb contaminants at depths as deep as effective dewatering can be accomplished. The water content of the bedrock and surrounding soil, the bedrock porosity and thermal conductivity, well spacing, and rate of power delivery have a major impact on the heating times required. As the contaminants are desorbed from the bedrock fractures, they are drawn to the wells by an off-gas collection system. As the contaminants pass through the wells and surrounding soil most of the hydrocarbons are destroyed by oxidation because of the high temperatures (800° C.–1000° C.) present in this region. The heating elements are placed in the wells and may be surrounded by an inert permeable non hygroscopic matrix to provide uniform flow and destruction of contaminants. The desorbed vapors pass to the off-gas collection system through openings at the top of the wells.

An insulation system consisting of vermiculite or ceramic fibers is used to prevent excessive heat loss from the surface and to protect components from the high temperatures present in the subsurface. An impermeable layer such as a metal sheet or a silicone-fiberglass sheet on top of the insulation is used as a vapor barrier to prevent the release of contaminants to the environment.

A metal sheet can be placed underneath the insulation to prevent water or contaminants from reaching the insulation.

Sampling ports can be added to facilitate collection of on-line performance data.

The off-gas collection system consists of exhaust blower (s) to remove vapors from the fractured bedrock and draw the contaminants through the heating elements for destruction and subsequently through a thermal oxidizer, heat exchanger(s) and heated vapor phase carbon drums. Vapor collection channels are included near the bottom of each well and are connected together at the top of the wells utilizing a manifolding system to facilitate treatment in a centralized off-gas treatment system. A cyclonic separator is used in the vapor stream to remove particulates. The thermal oxidizer, which may be heated electrically or by a clean burning gas such as propane, is used to destroy any residual hydrocarbons or products of incomplete combustion which may pass through the heating elements. For bedrock contaminated with high levels of chlorinated hydrocarbons, the fuel value of the contaminants can be used to supplement the heat input to the oxidizer. As a final polishing step and safety feature, the heated carbon drums will remove hydrocarbons which may pass through the prior treatment systems. Bypasses may be included to permit vapors to pass by the thermal oxidizer directly to the heated carbon drums or the carbon drums can be bypassed if contaminant emissions are below the regulatory guidelines using the thermal wells and thermal oxidizer alone. The heat exchanger is used to cool the vapors sufficiently to prevent overheating of the carbon. Where chlorinated hydrocarbons are being treated in sufficient concentrations to generate acid gases in excess of regulatory guidelines, an HCl scrubber can be added to remove these vapors.

The electrically-powered resistive heating elements are placed within bedrock wells which are screened to be permeable to vapors which emanate from within the fractures when heated. The thermal wells are operated for a period of time sufficient to reduce contamination to required levels. A permeable, thermally insulating mat is located above the surface, and a sheet impermeable to vapors is placed on top of the mat to contain contaminant vapors and prevent the infiltration of surface water or rainwater. A vacuum is established in selective wells through which vaporized contaminants are drawn as the fractured bedrock is heated. Much of the contaminant destruction will occur in close proximity to or within the thermal wells as the vapors pass through the hot bedrock and across the heating elements on their way to the surface. A flameless thermal oxidizer is used to destroy any residual hydrocarbon contaminants. Heated carbon units or an HCl scrubber may be required for remediation of the broad range of chlorinated solvents and hydrocarbons which are treatable by the in-situ fractured bedrock DNAPL removal and treatment system.

The carbon units or HCl scrubber can be heated to sufficient temperatures to avoid condensation of steam but low enough to trap target contaminants in the vapor stream.

The present system includes a passive dewatering system to prevent the infiltration of ground water or an approach for removal of dense non-aqueous phase liquids from fractured bedrock. The system approach utilizes selective wells for extraction of vapors to promote convective heat transfer throughout the bedrock fractures as vapors are drawn into the heated zone through some of the installed wells. Thermal diffusion across fractures relies on the low thermal conductivity of gases. Thus, for fractured bedrock, it might be necessary or advantageous to provide molecular transport by passing hot air into the heated zone of some of the thermal wells. The gases passing through the thermal well will heat up to about the temperature of the heaters. Pulling the hot gases through a fracture can transfer energy to the surrounding rocks more efficiently than would occur by relying solely on thermal diffusion. A manifold system is used to collect vapors from each thermal well and direct contaminants through a centralized off-gas treatment system which includes a flameless thermal oxidizer in lieu of an incinerator or condensation system. The use of a flameless thermal oxidizer results in more complete destruction of contaminants, less potential for toxic by-products, and essentially elimination of nitrogen oxides emissions than incineration. Alternative energy sources such as propane or gas fueled pipes could be used instead of electric heaters.

The thermal well casings are placed in holes drilled in the soil and bedrock to depths that extend slightly below the contaminated zone. Alternatively, the well casings may be driven into the soil and bedrock by conventional pile driving techniques such as hammers or ultrasonic devices. The heater wells need not be cemented in place and therefore can be removed and reused after the process is completed and the soil and bedrock cools down. Depending on the geometry of the contaminated zone, the wells can have any appropriate configuration. They need not be vertical but can be directionally drilled horizontally, or a combination of vertical and horizontal sections. Alternatively, the wells can be drilled at an inclined angle.

The thermal wells are arranged in a pattern so as to achieve the most uniform heating throughout the pattern. A regular pattern of heater wells can be used, such as triangular, square, rectangular, hexagonal, etc., chosen to substantially cover the contaminated area. Triangular patterns are preferred since they provide the best thermal efficiency and, in practice, are easy to locate on the soil surface. The temperature in the soil is raised by applying heat from the heater wells. A thermal front moves away from the wells into the soil by thermal conduction or molecular transport thereby vaporizing water and contaminants in the near surface soil. The superposition of the heat flow from all the heater wells results in a more uniform rise in temperature within the pattern. The spacing and number of heater wells is determined by the time desired to complete the process and by economic considerations.

The vacuum pumping lines from the heater wells are connected together at the surface to a vacuum pumping manifold and thence to a vacuum pump. At the surface, provision is made for trapping contaminants, for example, by wet scrubbers, activated carbon columns, chemical absorbents or for in-line destruction by catalytic oxidation or incineration.

An impermeable flexible sheet can be placed on the soil surface which can seal to the soil surface as a vacuum is pulled through the heater wells. Mats which are good thermal insulators are placed above or below the impermeable flexible sheet. The thermal insulation reduces heat losses through the soil surface, resulting in a more energy efficient process.

What is claimed is:

1. A system for decontamination of fractured bedrock contaminated by dense nonaqueous liquids by removal and destruction of said liquids comprising;

at least one interceptor trench that is located upgradient of the contaminated bedrock to prevent infiltration of the contaminated bedrock by uncontaminated groundwater; heater elements, positioned in the contaminated bedrock, for heating the bedrock to a temperature sufficient to volatilize the contaminants;

contaminant treatment apparatus for destroying the contaminants; and contaminant transport means, connected to the heater elements and the contaminant treatment apparatus, for transporting any resulting volatilized contaminants from the heater elements to contaminant treatment apparatus.

2. The system of claim 1, wherein the contaminant treatment apparatus comprises:

a cyclonic separator, a thermal oxidizer; and heated carbon beds connected to the thermal oxidizer.

3. The system of claim 1, wherein the heating elements comprise a plurality of electric resistor heater elements.

* * * * *